(12) United States Patent
Kryger

(10) Patent No.: US 7,606,815 B1
(45) Date of Patent: Oct. 20, 2009

(54) NON-RECURSIVE PROCESSING OF HIERARCHICAL DATA

(75) Inventor: Nathan Kryger, Snoqualmie, WA (US)

(73) Assignee: EMC Corporation, Hopkinton, MA (US)

( * ) Notice: Subject to any disclaimer, the term of this patent is extended or adjusted under 35 U.S.C. 154(b) by 505 days.

(21) Appl. No.: 11/093,019

(22) Filed: Mar. 29, 2005

(51) Int. Cl.
*G06F 17/00* (2006.01)
*G06F 17/30* (2006.01)

(52) U.S. Cl. .................. 707/101; 707/102; 707/103 R; 707/104.1

(58) Field of Classification Search ................... 707/101
See application file for complete search history.

(56) References Cited

U.S. PATENT DOCUMENTS

| | | | | |
|---|---|---|---|---|
| 5,983,248 A | * | 11/1999 | DeRose et al. | 715/513 |
| 5,999,735 A | * | 12/1999 | Radigan | 717/152 |
| 6,006,233 A | * | 12/1999 | Schultz | 707/101 |
| 6,035,269 A | * | 3/2000 | Kim | 704/9 |
| 6,112,209 A | * | 8/2000 | Gusack | 707/101 |
| 6,141,738 A | * | 10/2000 | Munter et al. | 711/206 |
| 6,243,720 B1 | * | 6/2001 | Munter et al. | 707/206 |
| 6,356,897 B1 | * | 3/2002 | Gusack | 707/4 |
| 6,381,739 B1 | * | 4/2002 | Breternitz et al. | 714/37 |
| 6,609,091 B1 | * | 8/2003 | Budzinski | 704/9 |
| 7,017,162 B2 | * | 3/2006 | Smith et al. | 719/328 |
| 2003/0088533 A1 | * | 5/2003 | Fortenberry et al. | 706/47 |

* cited by examiner

*Primary Examiner*—Greta L Robinson
*Assistant Examiner*—James J Wilcox
(74) *Attorney, Agent, or Firm*—Van Pelt, Yi & James LLP

(57) ABSTRACT

Non-recursive traversal of hierarchical data structures is disclosed. Elements inside a hierarchical data structure are processed beginning at a first level of the hierarchical data structure. In the event that a branch point associated with a second level of the hierarchical data structure is encountered, a marker data associated with a location of the branch point within the hierarchical data structure is stored inside a user allocated data structure, and the marker stored in the user allocated data structure is used to enable elements, if any, in the second level and any remaining elements in the first level, if any, to be processed without recursion.

24 Claims, 6 Drawing Sheets

NON-RECURSIVE PROCESSING OF HIERARCHICAL DATA

BACKGROUND OF THE INVENTION

Many applications require traversal of a file system or other hierarchical data structure. For example, searching through a file system requires reading through the entire directory structure in order to process every file in the system. A file system is represented as a hierarchical tree data structure with each directory as a branch and each file as a leaf. Traditionally traversal of such a tree data structure is accomplished using a recursive algorithm such as the following function:

1. Read an entry in the current directory.
2. If it is a directory, set the current directory to the new directory and recursively reenter this function.
3. If there are no more entries exit this function.
4. Go back to step one to read the next entry.

This traditional method has limitations due to its recursive nature—the function calls itself over and over again. Since each function call can incur large amounts of computational and memory overhead, traversing a very deep directory structure can cause a program crash, e.g., due to insufficient call stack space. Also deep recursive function calls can hinder application performance. Therefore, there is a need for a way to traverse hierarchical data structures more efficiently.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying Figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Non-recursive traversal of hierarchical data structures is disclosed. In an embodiment, a data structure may include elements of data and branch points, e.g., a tree structure. In an embodiment, a user allocated data structure is used to keep track of the places in the data structure rather than using call stack memory space. When a branch point is encountered inside the processing loop, the current place in the branch currently being processed is saved to the user allocated data structure to be returned back to later after processing the items down the newly encountered branch point.

Figure 1A:
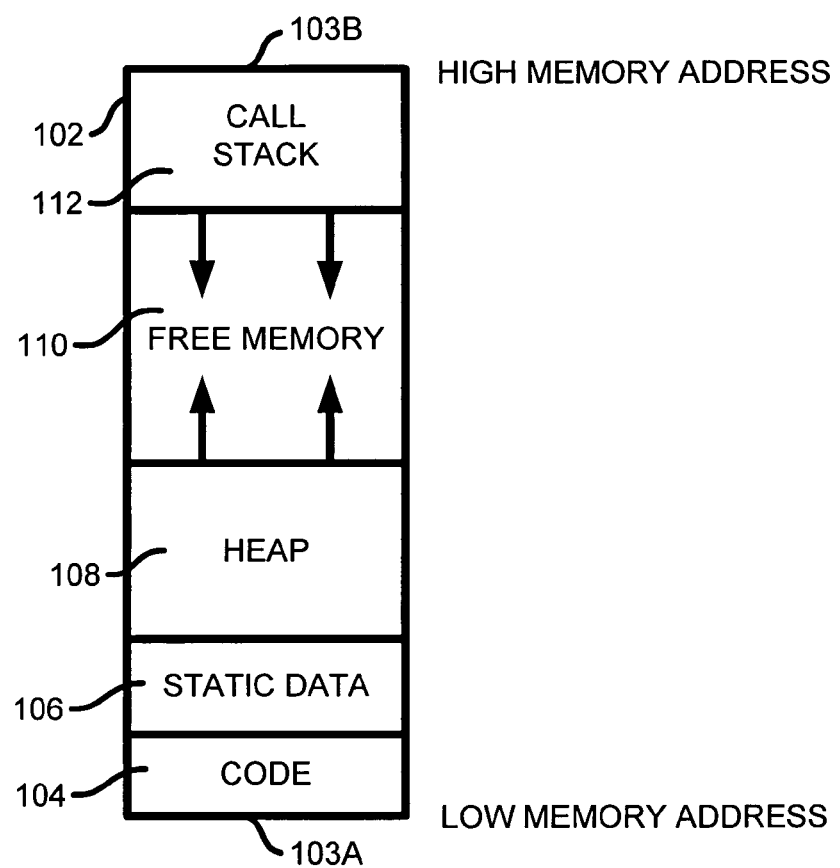
FIG. 1A illustrates in schematic form an embodiment of a computer memory environment.
Figure 1B:
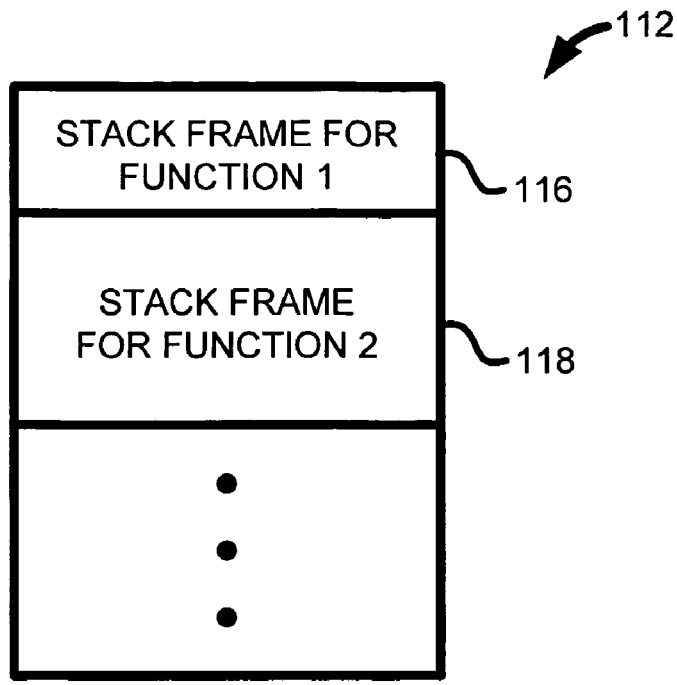
FIG. 1B illustrates an embodiment of call stack 112.
Figure 1C:
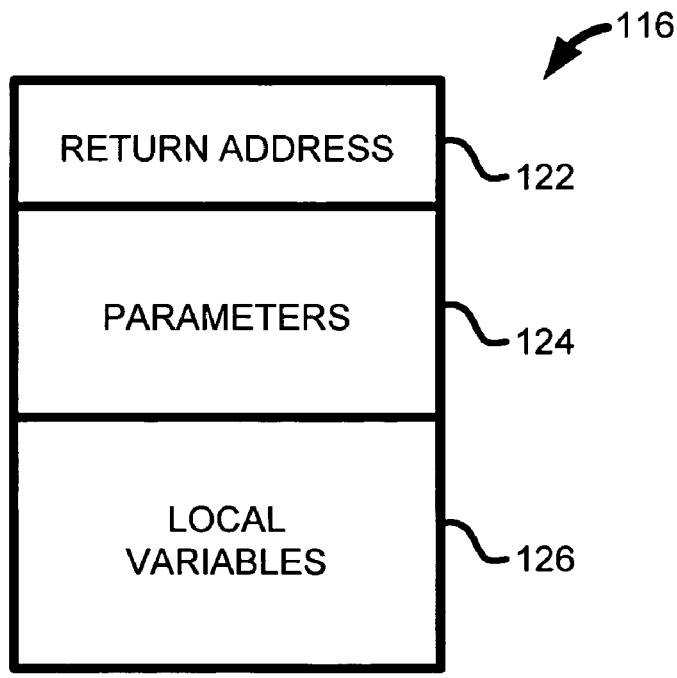
FIG. 1C illustrates an embodiment of a call stack frame.

FIG. 1A illustrates in schematic form an embodiment of a computer memory environment. In this example, a program memory space 102 is bounded by a low memory address 103a and a high memory address 103b. At the lower memory address 103a, currently running program code 104 exists. Higher up in memory address, static data 106 defined in the program exists. The rest of memory space is composed of heap 108, free memory 110, and call stack 112. Heap 108 contains user allocated and/or dynamically allocated memory structures. Heap 108 grows up into free memory 110 as more space is needed. Call stack 112 starts at a high memory address and grows down into free memory space 110 as more space is needed. FIG. 1B illustrates an embodiment of call stack 112. Call stack 112 includes a call stack frame for each function that has not completed. In the example shown, call stack frame 116 is associated with a first function and call stack frame 118 is associated with a second function. FIG. 1C illustrates an embodiment of a call stack frame. In the example shown, the call stack frame 116 includes a return address 122, parameters 124 of the function, and local variables 126. Theoretically the call stack space is bounded by the amount of free memory in a system, but in some systems the maximum size of call stack 112 is defined by the operating system. Consequently having a large number of outstanding function calls, as could occur, e.g., when using a recursive algorithm to traverse a very deep file structure, can cause the call stack space to be exhausted.

In recursive algorithms used to traverse hierarchical data structures, the call stack keeps track of places in the hierarchical data structure to return back to after a new function call processes each newly encountered branch. When processing of a branch is completed, the instance of the recursive function that was processing the branch terminates, freeing the associated call stack space, and processing continues by operation of the next pending function in the call stack, which resume operation where it left off when the just-completed branch was encountered. Employing a user allocated data structure, in the heap for example, to keep track of the return points is disclosed. Using the heap or other user allocated memory instead of the call stack can improve efficiency of a program by eliminating extra recursive function calls that can incur computational penalty. Additionally, memory use becomes more efficient as the required memory space for the return address, extra parameters, and extra local variables of each extra recursive function call are eliminated. In one embodiment, the user allocated data structure is allocated in the heap. In one embodiment the user allocated data structure is allocated in user memory. In one embodiment, the user allocated data structure is allocated in static data. In other embodiments, user allocated data structure is allocated in any memory other than the call stack.

Figure 2:
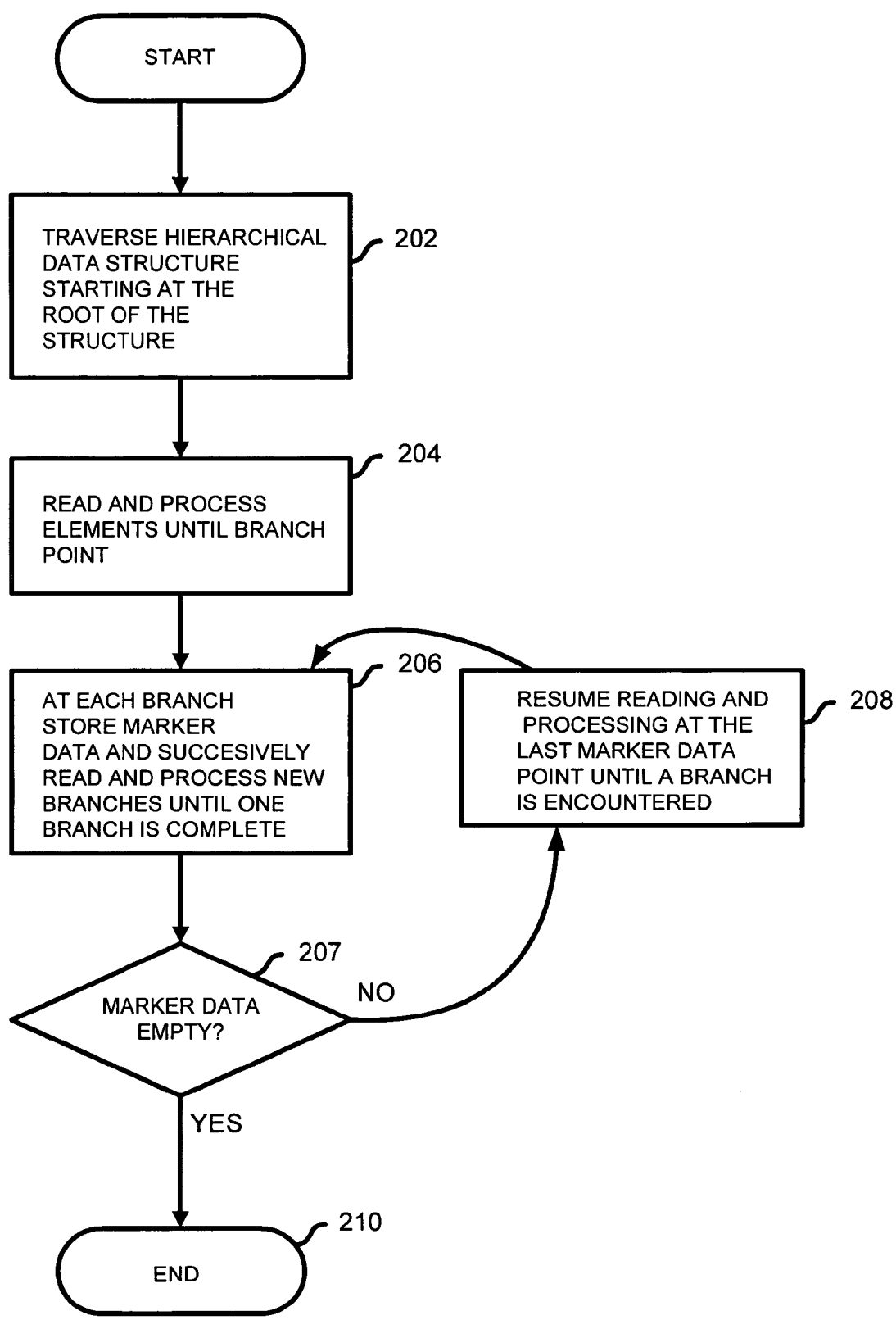
FIG. 2 illustrates an embodiment of a process for non-recursively traversing a hierarchical data structure.

FIG. 2 illustrates an embodiment of a process for non-recursively traversing a hierarchical data structure. At 202 the hierarchical data structure is traversed starting at the root branch. In other embodiments, the traversal could start at any point in the hierarchical data structure. In one embodiment, the hierarchical data structure is a tree data structure. In one embodiment, the hierarchical data structure is a file system directory and the root branch is a root directory. In one embodiment, the hierarchical data structure is a linked list. In one embodiment, the hierarchical data structure is a queue. In one embodiment, the hierarchical data structure is a hash table. In other embodiments, the hierarchical data structure could be any multilevel data structure. At 204 each element in the starting branch is read and processed until a branch point is encountered at 206. In one embodiment, the process of FIG. 2 ends if processing of the starting branch at 204 is completed without a branch point being encountered. Each time a branch point is encountered, at 206 marker information about the current branch and data associated with the location at which the branch was encountered in said current branch is stored in a user allocated data structure, and the contents of the encountered branch is read and processed, successively storing marker information and processing each encountered branch until processing of a branch is completed, e.g., by completing processing of a final element of the branch. In one embodiment, a branch is completely processed before processing sub-branches stored in the user allocated data structure, i.e., data not related to branch points are processed before sub-branches are processed. Depending on the embodiment, the user allocated data structure may comprise a stack data structure, a queue, a linked list, an array, a hash table, a table, and/or any data structure able to hold data. When a branch is completed, the user allocated data structure is checked at 207 to see if any branches still need to be processed. In some embodiments, each entry, if any, in the user allocated data structure indicates an unfinished branch. If the user allocated data structure is not empty, traversal is resumed at the last entered marker data point at 208. In other embodiments, the processing could resume at any of the stored marker data points. The process loops back to 206 once a new branch point is encountered. If the user allocated data structure was empty at 207, the process ends at 210.

Figure 3:
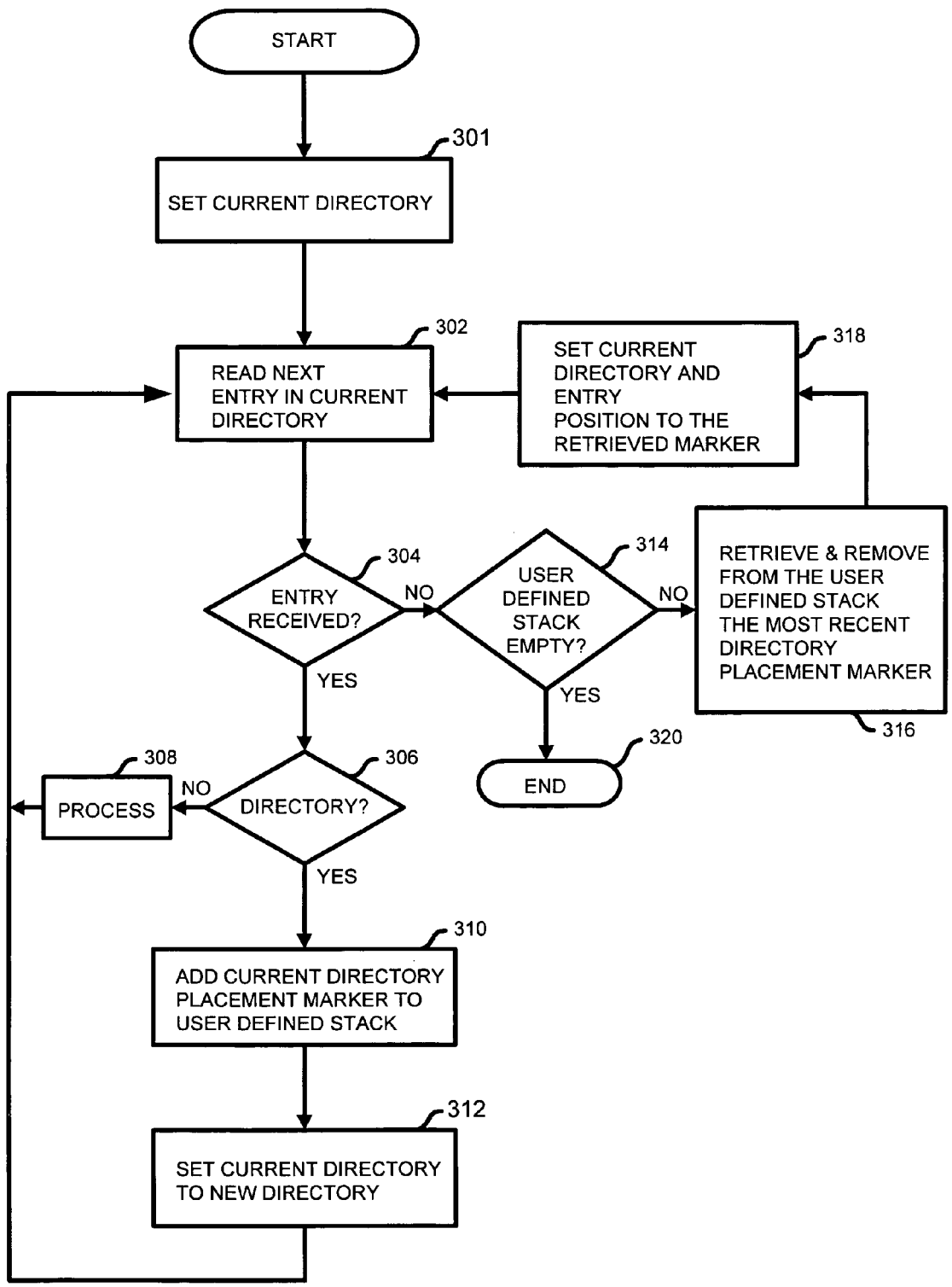
FIG. 3 illustrates an embodiment of a process for non-recursively traversing a directory structure.

FIG. 3 illustrates an embodiment of a process for non-recursively traversing a directory structure. In other embodiments, the process of FIG. 3 is used to traverse a hierarchical data structure other than a directory structure. In some embodiments, the process of FIG. 3 is used to enumerate and/or otherwise process files and/or subdirectories found in a file system directory. In the example shown, at 301 the current directory is set. In one embodiment the current directory is set in 301 to the root directory. In one embodiment the current directory is set in 301 to a user configured directory. The current directory may be preconfigured and/or dynamically configured. At 302, the next entry in the current directory is read. If it is determined at 304 that a valid entry has been read (end of directory not reached) the entry is checked at 306 to determine if the entry is a directory (e.g., a subdirectory or branch associated with a next level down within the hierarchical data structure). If it is determined at 306 that the entry is not a directory (e.g., the entry is a file, in the case of a file system directory), the entry is processed at 308, and the next entry in the current directory is read at 302. In some embodiments, the processing performed at 308 includes adding the file to a list or other data repository of the names (and/or other attributes) of the files in a file system associated with the directory set as the current directory in 301.

If it is determined at 306 that the entry read at 302 is a directory, a marker for the last read place in the current directory is stored in a user allocated data structure (e.g., a user-defined stack). In the example shown, the user allocated data structure is a user-defined stack, but any other suitable user-defined data structure may be used. In one embodiment, the marker includes a directory path or other identifier associated with the directory with which the marker is associated (i.e., the directory that was being processed when the directory entry read in 302 and identified as being a directory in 306 was encountered) and a placement marker that identifies the location within the directory with which the marker is associated at which the directory entry read in 302 and identified as being a directory in 306 was encountered. In one embodiment, the marker is a file handle received in response to a file system call. In other embodiments the marker is a programming language specific object related to directory and/or file handling. In 312 the current directory is set as the new directory (i.e., the directory entry read in 302 and identified as being a directory in 306), and the next entry in the newly set current directory is read at 302.

If the end of a directory has been reached, i.e., it is determined in 304 that no next entry was available to be provided in response to a read operation at 302, the user allocated stack is checked at 314 to determine if the stack contains any entries. If the stack is empty, the process ends at 320. If an entry exists, the marker that was added to the user defined stack most recently is retrieved and removed from the user allocated stack at 316, and the current directory and the current entry positions are set at 318 to the place pointed to by the marker retrieved at 316, after which processing resumes in the newly set current directory beginning by reading at 302 the next entry in that directory (i.e., the entry after the one last processed in that directory, as indicated by the marker information retrieved at 316). In another embodiment, a least recent directory placement marker is retrieved and removed depending upon the configuration of the user defined stack. In other embodiments, the marker is not removed and a current stack indicator is used.

Figure 4A:
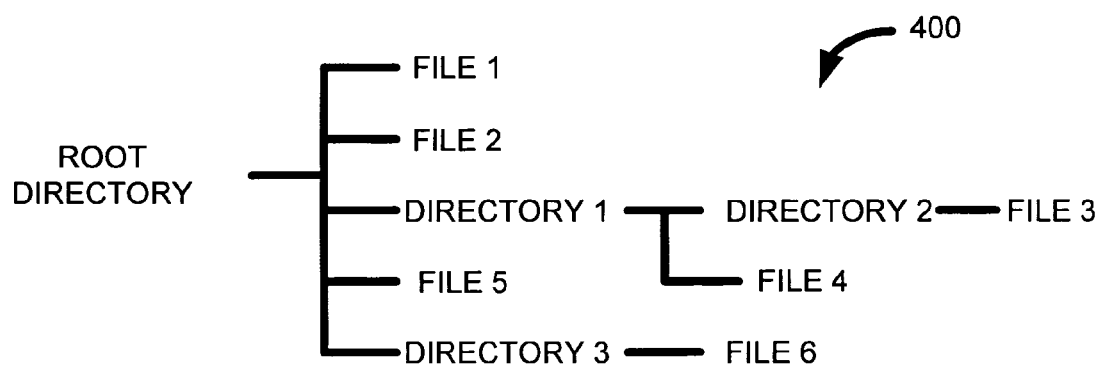
FIG. 4A illustrates an example of a directory structure. Directory structure 400 includes multiple files and subdirectories.

FIG. 4A illustrates an example of a directory structure. Directory structure 400 includes multiple files and subdirectories. In other embodiments the directory structure can have any number of configurations, comprising any number of files and directories. This example has been simplified to illustrate the embodiment clearly.

Figure 4B:
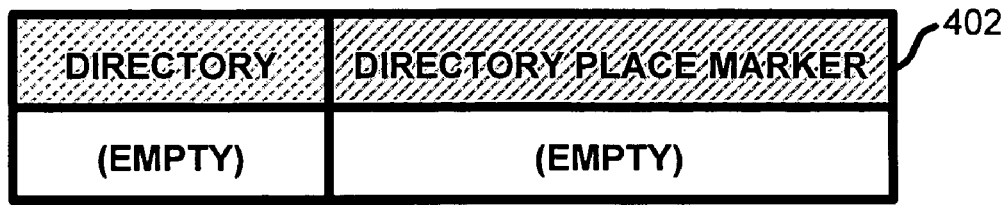
FIGS. 4B-4E illustrate an example of the contents of a user allocated data structure, as implemented in an embodiment, at various points during directory traversal.
Figure 4C:
Figure 4D:
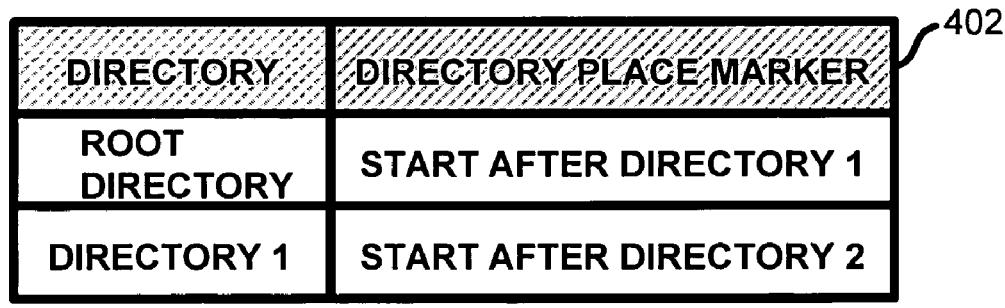
Figure 4E:

FIGS. 4B-4E illustrate an example of the contents of a user allocated data structure, as implemented in an embodiment, at various points during directory traversal. Each of FIGS. 4B-4E shows the data stored in a user allocated data structure 402 at various points in traversal of directory structure 400 of FIG. 4A. The data structure 402 is shown in a table format in this embodiment, but any suitable data structure and/or format may be used. Data structure 402 is configured to store data associated with a directory (current directory when a new directory is encountered) and a directory place marker (place in the stored directory to start after resuming in the stored directory). In one embodiment, the directory and directory place marker information are combined into one or more units of information per branch point entry. The entry may be any user allocated or programming language specific object related to directory and/or file handling. The actual user allocated data structures can be any data structure able to hold a placement marker. In some embodiments, the traversal of the directory structure 400 of FIG. 4 starts at the root directory. Initially the user allocated data structure 402 is empty as shown in FIG. 4B. File 1 and File 2 are successively read and processed. After reading Directory 1, an entry is made in the user allocated data structure 402 to start after Directory 1 when processing of the root directory resumes, as shown in FIG. 4C. Traversal is continued in Directory 1. Since the first entry in Directory 1 is Directory 2, another entry is made in the user allocated data structure 402 to start after Directory 2 when processing of Directory 1 resumes, as shown in FIG. 4D. Traversal is continued in Directory 2. File 3 is read and processed. Since Directory 2 has been completely read and processed, the last entry in the user allocated data structure is retrieved and removed, returning the user allocated data structure 402 to the state shown in FIG. 4C. Traversal of Directory 1 resumes beginning with the entry indicated by the retrieved marker, i.e., in this example File 4 is read and processed. Since processing of Directory 1 is completed once File 4 is read and processed, the last entry in the user allocated data structure is retrieved and removed, returning the user allocated data structure 402 to the state shown in FIG. 4B (i.e., empty). The retrieved entry (see FIG. 4C) indicates processing should resume in the root directory starting after Directory 1, which results in File 5 being read and processed. Upon reading Directory 3, an entry is made in the user allocated data structure 402 to start in the root directory after Directory 3 once processing of Directory 3 has been completed, as shown in FIG. 4E. File 6 is read and processed. Since Directory 3 has been completely read and processed, the last entry in the user allocated data structure is retrieved and removed, returning the user allocated data structure 402 to the state shown in FIG. 3. No more entries are remaining in both the root directory and the user allocated directory, and the traversal ends.

The processes shown in FIGS. 2 and 3 and described above may be implemented in any suitable way, such as one or more integrated circuits and/or other device, or as firmware, software, or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for traversing a hierarchical data structure, comprising:
    processing elements inside the hierarchical data structure beginning at a first level of the hierarchical data structure; and
    in the event that a branch point associated with a second level of the hierarchical data structure is encountered:
        using a processor to store, inside a user allocated data structure, marker data that includes location information describing the location the branch point was encountered within the hierarchical data structure and excludes at least one of the following: a return address, a parameter, or a local variable associated with a function call; and
        using the marker data stored in the user allocated data structure to enable any elements in the second level and any remaining elements in the first level to be processed without recursion, comprising:
            processing any elements in the second level associated with the branch point without making a recursive function call;
            retrieving the marker data, using the processor, upon completion of processing elements in the second level; and
            using the marker data to resume processing in the first level of the hierarchical data structure at the location with which the marker data is associated.

2. A computer-implemented method for traversing a hierarchical data structure, comprising:
    processing elements inside the hierarchical data structure beginning at a first level of the hierarchical data structure; and
    in the event that a branch point associated with a second level of the hierarchical data structure is encountered:
        using a processor to store, inside a user allocated data structure, marker data that includes location information describing the location the branch point was encountered within the hierarchical data structure and excludes at least one of the following: a return address, a parameter, or a local variable associated with a function call; and
        using the marker data stored in the user allocated data structure to enable any elements in the second level and any remaining elements in the first level to be processed without recursion, comprising:
            completing the processing of elements in the first level that are not branch points prior to processing the branch point;
            retrieving the marker data using the processor; and
            using the marker data to process any elements associated with the branch point.

3. A method as recited in claim 2, wherein the first level includes zero or more branch points, each having associated with it zero or more elements in the second level, and using the marker data stored in the user allocated data structure to enable any elements in the second level and any remaining elements in the first level to be processed without recursion comprises:
    completing the processing of elements in the first level that are not branch points prior to processing any branch points found in the first level; and
    processing branch points found in the first level without recursion including by, for each branch point:
        retrieving the marker data associated with the branch point; and
        using the marker data to process elements associated with the branch point.

4. A method as recited in claim 1, wherein the hierarchical data structure may include any arbitrary number of levels and/or branch points and the process further comprises:
    (a) for each branch point encountered, storing an associated marker data in the user allocated data structure and successively processing new branches, as encountered, until processing is completed with respect to a branch;
    (b) resuming processing, upon completion of a branch, at the location associated with a next marker data stored in the user allocated data structure in the user allocated data structure until a branch point is encountered; and
    (c) repeating (a) and (b), as applicable, until processing of a branch is completed at a time when no marker data is stored in the user allocated data structure.

5. A method as recited in claim 4, wherein the next marker data is the most recently stored marker data.

6. A method as recited in claim 4, wherein the next marker data is the least recently stored marker data.

7. A method as recited in claim 1, wherein the hierarchical data structure comprises a file system.

8. A method as recited in claim 1, wherein the hierarchical data structure comprises a tree, a linked list, a hash table, or a queue.

9. A method as recited in claim 1, wherein the user allocated data structure is allocated in the heap.

10. A method as recited in claim 1, wherein the user allocated data structure is allocated in user memory.

11. A method as recited in claim 1, wherein the user allocated data structure is allocated in static data.

12. A method as recited in claim 1, wherein the user allocated data structure comprises a stack, a queue, an array, a table, a linked list, or a hash table.

13. A method as recited in claim 1, wherein the marker data includes a file handle, a file name, a directory name, a directory path, or a programming library object.

14. A method as recited in claim 1, further comprising traversing a branch point when the branch point is encountered.

15. A system for traversing a hierarchical data structure, comprising:
   a processor configured to process elements inside the hierarchical data structure beginning at a first level of the hierarchical data structure and in the event that a branch point associated with a second level of the hierarchical data structure is encountered:
      store, inside a user allocated data structure, marker data that includes location information describing the location the branch point was encountered within the hierarchical data structure and excludes at least one of the following: a return address, a parameter, or a local variable associated with a function call; and
      use the marker data stored in the user allocated data structure to enable any elements in the second level and any remaining elements in the first level to be processed without recursion, by:
         processing any elements in the second level associated with the branch point without making a recursive function call;
         retrieving the marker data upon completion of processing elements in the second level; and
         using the marker data to resume processing in the first level of the hierarchical data structure at the location with which the marker data is associated; and
   a memory configured to store the user allocated data structure.

16. A system as recited in claim 15, wherein the hierarchical data structure may include any arbitrary number of levels and/or branch points and the processor is further configured to:
   (a) for each branch point encountered, store an associated marker data in the user allocated data structure and successively process new branches, as encountered, until processing is completed with respect to a branch;
   (b) resume processing, upon completion of a branch, at the location associated with a next marker data stored in the user allocated data structure in the user allocated data structure until a branch point is encountered; and
   (c) repeat (a) and (b), as applicable, until processing of a branch is completed at a time when no marker data is stored in the user allocated data structure.

17. A system as recited in claim 16, wherein the next marker data is the most recently stored marker data.

18. A system as recited in claim 16, wherein the next marker data is the least recently stored marker data.

19. A system as recited in claim 15, wherein the hierarchical data structure comprises a file system.

20. A system as recited in claim 15, wherein the user allocated data structure is allocated in user memory.

21. A computer program product for traversing hierarchical data structure, the computer program product being embodied in a computer readable storage medium and comprising computer instructions for:
   processing elements inside the hierarchical data structure beginning at a first level of the hierarchical data structure; and
   in the event that a branch point associated with a second level of the hierarchical data structure is encountered:
      storing, inside a user allocated data structure, marker data that includes location information describing the location the branch point was encountered within the hierarchical data structure and excludes at least one of the following: a return address, a parameter, or a local variable associated with a function call; and
      using the marker data stored in the user allocated data structure to enable any elements in the second level and any remaining elements in the first level to be processed without recursion, comprising:
         completing the processing of elements in the first level that are not branch points prior to processing the branch point;
         retrieving the marker data; and
         using the marker data to process any elements associated with the branch point.

22. A computer program product as recited in claim 21, wherein the first level includes zero or more branch points, each having associated with it zero or more elements in the second level, and using the marker data stored in the user allocated data structure to enable any elements in the second level and any remaining elements in the first level to be processed without recursion comprises:
   completing the processing of elements in the first level that are not branch points prior to processing any branch points found in the first level; and
   processing branch points found in the first level without recursion including by, for each branch point:
      retrieving the marker data associated with the branch point; and
      using the marker data to process elements associated with the branch point.

23. A computer program product as recited in claim 21, wherein the hierarchical data structure comprises a file system.

24. A computer program product as recited in claim 21, wherein the user allocated data structure is allocated in user memory.

* * * * *